United States Patent [19]

Enge

[11] Patent Number: 4,821,038

[45] Date of Patent: Apr. 11, 1989

[54] METHOD OF AND APPARATUS FOR LORAN-C MESSAGE COMMUNICATION WITH REDUCED SKYWAVE NAVIGATION LOCATION ERRORS AND THE LIKE

[75] Inventor: Per Enge, Grafton, Mass.

[73] Assignee: Megapulse Incorporated, Bedford, Mass.

[21] Appl. No.: 116,381

[22] Filed: Nov. 3, 1987

[51] Int. Cl.$^4$ ........................ H01J 29/70; H01J 29/72
[52] U.S. Cl. .................................... 342/390; 342/389
[58] Field of Search ................. 342/389, 390; 364/452

[56] References Cited

U.S. PATENT DOCUMENTS

| | | | |
|---|---|---|---|
| 3,711,725 | 1/1973 | Johannessen | 307/108 |
| 3,736,590 | 5/1973 | Lipsey et al. | 343/103 |
| 3,774,210 | 11/1973 | Mollod et al. | 343/103 |
| 3,889,263 | 6/1975 | Johannessen | 343/103 |
| 3,921,076 | 11/1975 | Currie | 325/321 |
| 4,001,598 | 1/1977 | Johannessen | 307/106 |
| 4,151,528 | 4/1979 | Johannessen | 343/103 |
| 4,392,138 | 7/1983 | Jasper et al. | 343/103 |
| 4,423,419 | 12/1983 | Johannessen | 343/387 |
| 4,482,896 | 11/1984 | Menick | 343/390 |

OTHER PUBLICATIONS

D. A. Feldman et al., "The Coast Guard Two Pulse Loran-C Communications System", *Journal of the Institute of Navigation*, vol. 23, No. 4, Winter 1976–77, pp. 279–285.

"Proceedings of the Institute of Navigation National Marine Navigation Meeting", Hunt Valley, Maryland, Oct. 14–15, 1975.

Walter N. Dean, "Clarinet Pilgrim System", The Magnavox Company Government and Industrial Group, Fort Wayne, Indiana; Sep. 30, 1973.

ITT Avionics Division, "Loran-C Phase Modulation Study, Final Technical Report", vol. I, Jun. 1970.

Radio Navigation Journal 1975, Wild Goose Association, Acton, Massachusetts.

*Primary Examiner*—Theodore M. Blum
*Attorney, Agent, or Firm*—Rines and Rines; Shapiro and Shapiro

[57] ABSTRACT

A Loran-C communications technique and system are disclosed involving appropriate encoding of communication messages and logical multiplication and inversion of encoded signals prior to phase modulation of the Loran-C pulses, with novel bit-flip connections for producing complementary plus and minus modulation position shifts in the first and third and second and fourth, etc., of the Loran-C pulse groups, and with perfect balance irrespective of the nature of the raw data and irrespective of skywave interference.

7 Claims, 4 Drawing Sheets

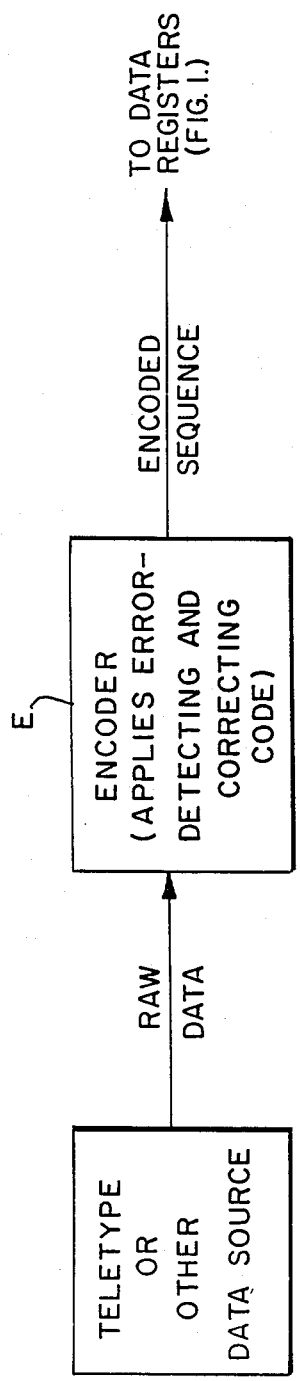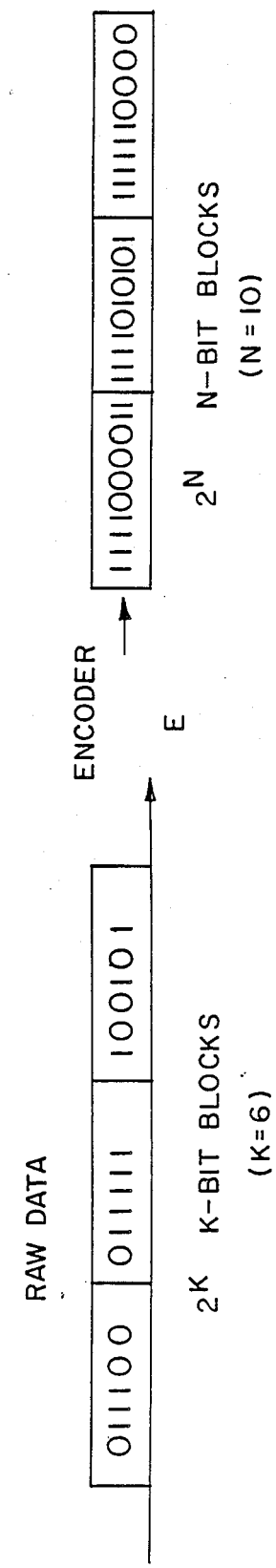

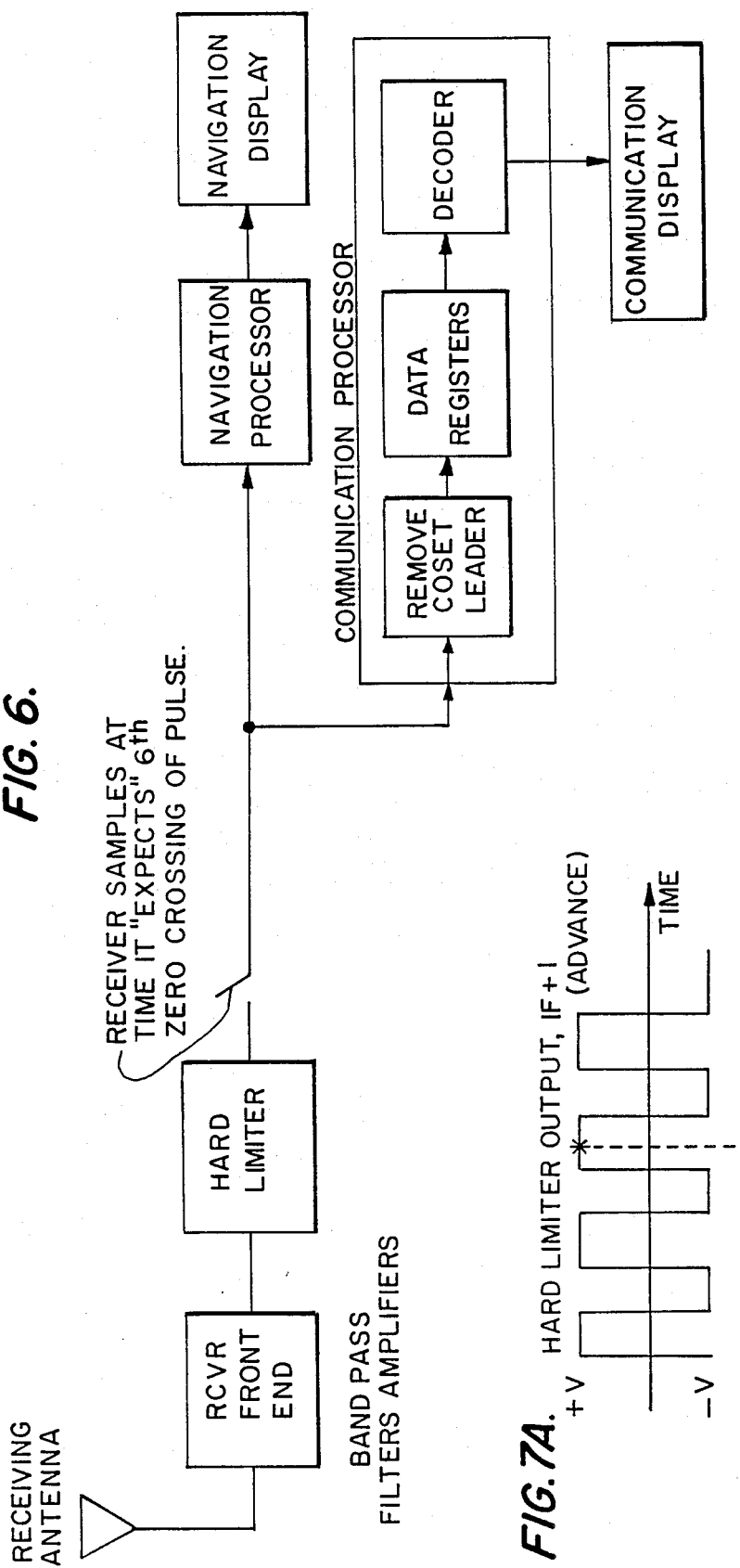

METHOD OF AND APPARATUS FOR LORAN-C MESSAGE COMMUNICATION WITH REDUCED SKYWAVE NAVIGATION LOCATION ERRORS AND THE LIKE

The present invention relates to the transmission of communication messages in digital form on Loran-C and similar radio navigation signals and the like, being more particularly directed to new techniques for eliminating errors caused not only by the nature of the digital message transmitted but, also, by errors in the navigation determination caused by skywave-introduced offset and fluctuations and the like.

Loran-C transmitting equipment is described, for example, in U.S. Pat. Nos. 3,711,725, 4,151,528, 3,889,263, 4,001,598 and 4,423,419, of common assignee herewith. The groups of spaced Loran-C pulse transmissions are received in vehicle located navigation receivers which monitor a particular zero crossing in the third cycle of the buildup of each Loran pulse of the groups of Loran pulses— i.e., the sixth zero crossing point. Suitable receiver equipment for such purposes is described, for example, in U.S. Pat. Nos. 3,921,076, 3,736,590, 3,774,210, 4,392,138 and 4,482,896.

It has heretofore been proposed, simultaneously with the transmission of Loran-C and similar navigational broadcast signals, to include in the train of navigation signals, modulations on the same carrier that could contain communication messages, as in digital data information form. Among the prior proposals for such operation have been the so-called Clarinet Pilgrim system, used by the U.S. Navy and described by Dean, W. N., "Clarinet Pilgrim System", *Magnavox*, Fort Wayne, Indiana, Sept. 30, 1973; International Telephone and Telegraph, "Loran-C Phase Modulation Study, Final Technical Report, Volume 1", prepared for the U.S. Coast Guard, June, 1979; and Radio Navigation Journal 1975, Wild Goose Association, Acton, Massachusetts, 1975.

In the Clarinet Pilgrim type of system, the first two pulses of the group of eight Loran-C pulses constituting a group transmission are not modulated; but one or more of pulses three through eight are modulated by moving the pulse back and forth in time intervals of one microsecond — so-called pulse position modulation. Usually, pseudo-random or plain data is used to modulate the pulse position, but on occasion, a synchronization word may be transmitted. In either event, the data is multiplied by a "bit flip" or inversion sequence or its complement, before it is applied to the pulse position modulation. Indeed, when the first, third or any odd pulse group is modulated, then the bit flip sequence is 00+ − + − − +. When the second, fourth or any even pulse group is modulated, then the complement of the bit flip sequence 00 − + − + + − is used. As an example, assume that the data stream + − + − + − + − + − + − is to be sent by a master station, beginning with a first interval. Pulses three through eight of that interval would be modulated as follows: + + + + − −, because this sequence is the product of the first part of the data stream and the bit flip sequence. The plus causes a pulse to be advanced by usually one microsecond or a fraction thereof such as ¾ microsecond, and the minus causes the pulse to be delayed by an identical time. Pulses three through eight of the following interval, or second group of Loran-C pulses, would be modulated, for example, − − − − + +. Other prior systems for communicating on the Loran-C transmission include one termed the so-called Teletype II system described, for example, in said Radio Navigation Journal article; and in the Coast Guard Two-Pulse Loran-C Communication System also described, for example, in the Radio Navigation Journal, and in Feldman, D.A., et al., "The Coast Guard Two-Pulse Loran-C Communications System", *Navigation—The Journal of the Institute of Navigation*, Vol. 23, No. 4, 1976-77; also published in the proceedings of the Institute of Navigation National Marine Navigation meeting, Hunt Valley, Maryland, October 14-15, 1975; and in the U.S. Coast Guard High-Speed Communication System similarly described in the Radio Navigation Journal and also in the said International Telephone and Telegraph Report of June 1979; and again the invention herein obviates the navigation error susceptibility of these symmetrical pulse position modulation techniques.

In particular connection with the said United States Coast Guard High Speed Communication System, a technique is introduced through the inversion or "bit flip" for logically multiplying the data-bit message before the data stream pulse-position modulates the transmitter to insure that there is a balance between the plusses and the minuses or +1's and −1's (or binary 0's) of the pulse position modulation sequence, as described in said Radio Navigation Journal article. Even though this Coast Guard system guarantees balance for the ground wave, however, it does not as well guarantee the delayed skywave contribution will be balanced; and that is a principal contribution of the present invention.

In accordance with the present invention, through the introduction of the concept of balancing a given Loran pulse with a pulse which occurs exactly two pulse groups later and which has identical skywave signal amplitudes at the sampling times as distinguished from the very different skywave amplitudes in successive Loran pulses within a group or within immediately adjacent groups, far greater insurance of accurate navigation locking is attained irrespective of skywave offsets and fluctuations and irrespective of the nature of the particular data group sequence that is modulated upon the pulse. (See, also, Per K. Enge et al., "Loran-C Communications", Proceedings of PLANS '86, November 4-7, 1986, where portions of this operation are set forth.)

Through a particular kind of encoding of the raw data bits, moreover, there can be greater insurance that the plusses and minuses or +1's and −1's (pulse position modulation advances and delays) are equal and that there is no gross imbalance involved in the modulation within each group; indeed, to provide identical numbers of plus and minus shifts in the first and third and the second and fourth, etc., Loran-C pulses that provide a perfect balance irrespective of the nature of the data in the message, and irrespective of skywave interference.

An object of the invention, accordingly, is to provide a new and improved Loran-C and similar message communication system, in particular of the type similar to the U.S. Coast Guard High Speed Communication System above-mentioned, in which also irrespective of the nature of the incoming digital sequence that is to modulate the signal, the further possibility of navigation errors at the receiver caused by skywave phase offsets and fluctuations is obviated and with protection against strong imbalances within single groups of the Loran-C transmissions in the plus and minus shifts in the modulation, preventing the possibility of a gross shift in one direction.

Other and further objects will be explained hereinafter and are more particularly delineated in the appended claims. In summary, however, from one of its aspects, the invention embraces in a Loran-C navigation and message communication system in which a plurality of successive Loran-C pulses within successive groups of such pulses are pulse position modulated to communicate blocks of K raw data-bit messages, a method of reducing errors in the reception of said pulses for navigation purposes by receivers which are unaware of the communications, such errors being caused by skywave-introduced phase offsets and fluctuations, and regardless of the nature of the bit messages, said method comprising converting the successive blocks of K raw data bits into respective encoded data of N bit blocks, where N is greater than K, and containing an error-detecting code; applying the respective encoded data blocks to successive Loran-C pulse groups; logically multiplying the successive encoded sequences of the respective first and second Loran-C pulse groups by respective coset leader sequences to produce data sequences that insure against gross imbalance in the plus and minus position modulations within a single group; pulse-position modulating said plurality of pulses in the first and second groups of Loran-C pulses with the respective resulting data sequences; inverting the respective encoded sequences for the first and second Loran-C pulse groups and applying the same, respectively, as the encoded data for the third and fourth Loran-C pulse groups; logically multiplying the same with the said respective coset leader sequences to produce resulting data sequences in the third and fourth Loran-C groups complementary to the respective first and second Loran-C group resulting data sequences and to produce exactly zero imbalance over the four groups; pulse-position modulating the plurality of successive pulses in the third and fourth groups of Loran-C pulses with the corresponding last-named resulting data sequences; and insuring that said coset leader sequences are excluded as a possible code for the converted raw data, whereby identical plus and minus position shifts will occur in the first and third Loran-C pulse groups and identical shifts in the second and fourth Loran-C pulse groups, each in perfect balance irrespective of the nature of the raw data and irrespective of skywave interference. Preferred and best mode embodiments and details are hereinafter presented.

The invention will now be explained in connection with the accompanying drawing, FIG. 1 of which is a block diagram illustrating a preferred system for practicing the technique underlying the present invention;

FIGS. 5A and 5B are block diagrams illustrating details for the encoder technique used in the transmitter of FIG. 3;

FIG. 6 is a block diagram of a suitable receiver for operation in accordance with the invention; and FIGS. 7A and 7B are wave form diagrams illustrating the operation of the receiver of FIG. 6.

Figure 4A:
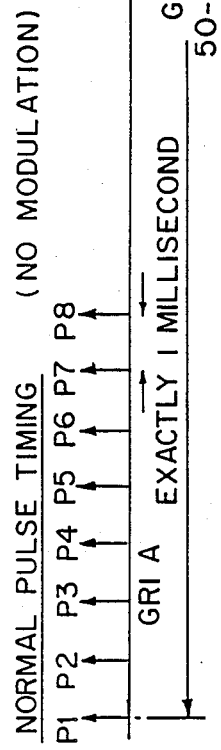
FIGS. 4A and 4B are timing diagrams illustrating normal pulse timing modulation and modulation in accordance with the invention.
Figure 4B:
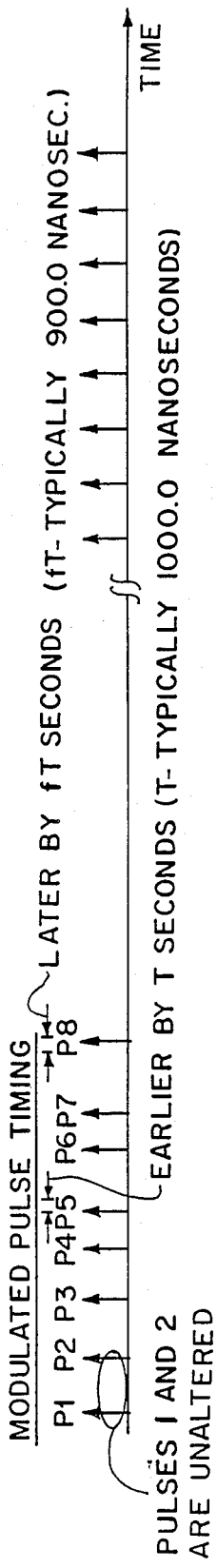

The invention, as before stated, is principally concerned with and is illustrated in connection with Loran-C pulse position modulated communications systems of the type explained in the said United States Coast Guard High Speed Communication System, with insurance of the balance between pulse position modulated pulse advances and delays. While such systems use symmetrical pulse modulation advances and delays (of the order of a microsecond), as explained in my copending application "Method of and Apparatus for Message Communication on Loran-C Navigational Signal Broadcasts and the Like with Reduced Navigation Errors", filed of even date herewith, navigation errors caused by such modulation can be obviated by the use of asymmetrical advance and delay times, (the former somewhat greater than the latter) later described in connection with FIGS. 4A and 4B, to compensate for different amplitudes in the positive and negative cycle portions adjacent the sixth zero crossing (third cycle of the Loran-C pulse) resulting from the increasing pulse envelope at that region. Such is also preferred herein.

Figure 1:
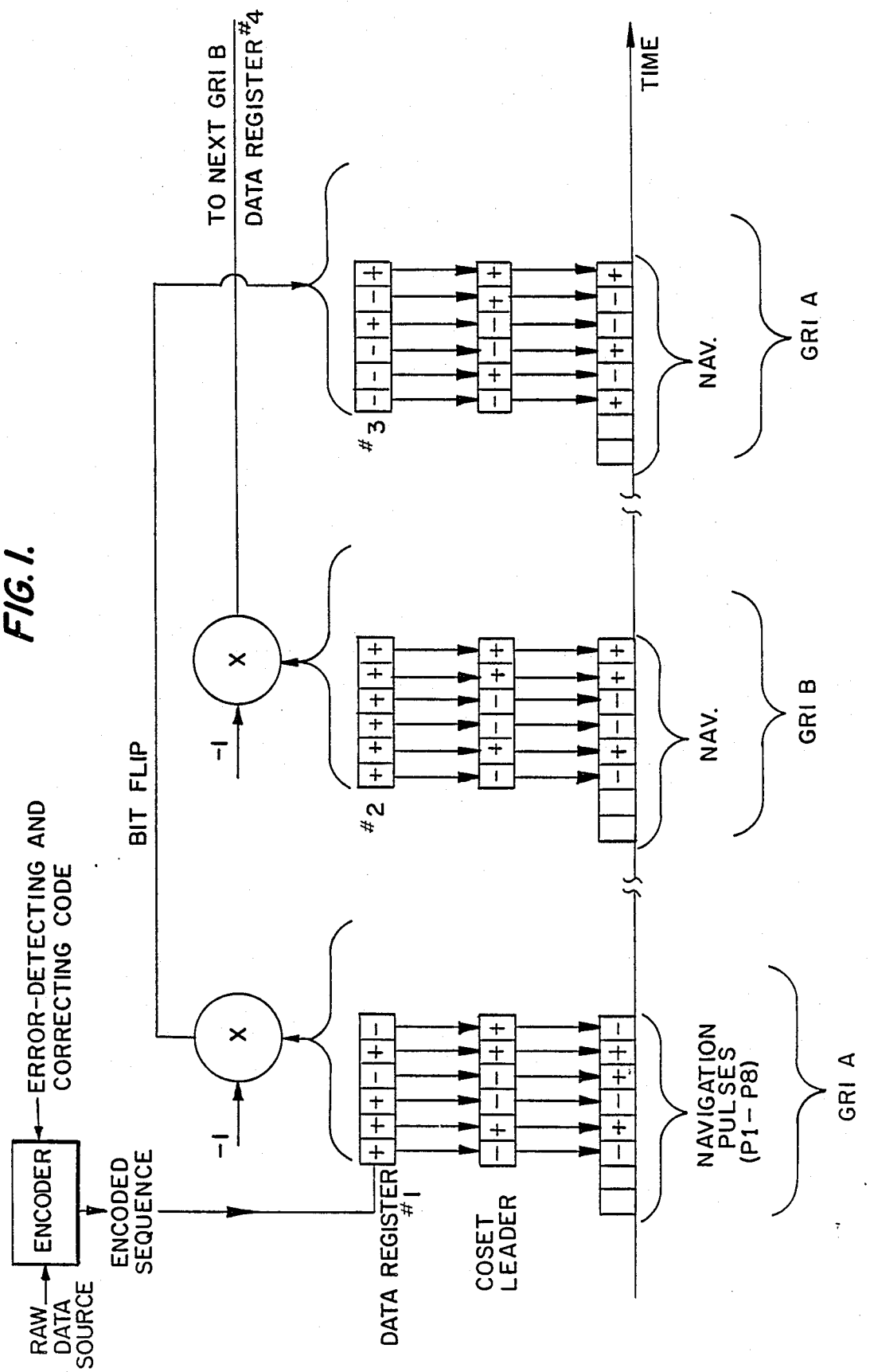

Turning to FIG. 1, at the bottom, three successive groups of eight navigation pulses P1-P8 are shown as blocks GRIA, GRIB, and then GRIA again, etc. Akin to Clarinet Pilgrim, in this embodiment there is no modulation of pulses P1 or P2 of any of the groups. The plurality of pulses P3-P8 that are modulated, are modulated by corresponding six data bits shown in the blocks +++−+− at the top, labelled "Data Register #1" after they are logically multiplied by a so-called Coset Leader, shown with sequence −+−−++ as an example in the left-most GRIA set. Instead of using the first + in the top block of Data Register #1 to pulse-position advance the third pulse P3 of the first navigation group GRIA, that + is first multiplied by the corresponding − of the Coset Leader to get a −; so, in fact, that third pulse P3 is delayed generally of the order of a microsecond. Correspondingly, the second data + of the first Data Register #1, times the second Coset Leader +, results in a +, or an advance, say of the order of a microsecond, of the fourth pulse P4 of GRIA; and so on. To anticipate slightly, in accordance with the invention, as more fully explained hereinafter, the data bits in Data Register #1 are used not only to modulate pulses of the navigation group GRIA, but also to modulate corresponding pulses of the third navigation group, the next GRIA, as well, after inversion or multiplication by −1, as shown at X.

The Data Registers #1, #2, #3, etc., are filled with data which comes from the encoder E and are filled with plus and minus ones. It is important to observe that whatever data is in Data Register #1, the inverse or the complement is in Data Register #3 in accordance with the invention, and for a later-described purpose. Likewise, whatever is in Data Register #2, its inverse or complement appears in Data Register #4 (not shown, but indicated). The bit flip operations X that appear near the top of the figure effect this inversion.

This bit flip or inversion sequence insures zero imbalance after four GRI's; i.e., that no matter what the nature of the data, over a rather short time embracing four GRI's, there will be as many + (advances) as − (delays) in the communication modulation of the third to eighth Loran-C pulses of each GRI, as described more fully in my said PLANS article and in the said United States Coast Guard High Speed Communication System article. If there was unbalance in + and − modulations over the receiver time constant period (say at least 4 GRI's), the navigation receiver may indicate a new shift, either earlier or later, in the arrival of this signal, with a consequent error in position fix. The balancing pulse is exactly two GRI's later than the original pulse, which means that it is identical in a number of important respects to the original pulse, and will have the same phase code.

But an important feature of the present invention is the use of the Coset Leader to insure, also, that there are no gross imbalances even within a single Loran-C group — no extreme situations such as nearly all pluses or nearly all minuses. Data Register #1 (+ + + − + −) does not therefore directly advance, advance, advance, delay, advance and delay. The data, as before explained, is first logically multiplied by the Coset Leader (− + − − + +, for example) so that the resulting sequence of the pulse position modulation is delay, advance, delay, advance, advance and delay. While this is not a particularly troublesome sequence, such is not the case with the all-plus data in Data Register #2. Instead of advancing every single pulse, the Coset Leader multiplication effects a more random modulation sequence: delay, advance, delay, delay, advance and advance. Consider, however, what would happen if the data register fills with exactly the Coset Leader sequence or its complement. Then, multiplying by the Coset Leader would take a rather random sequence and make it into one of the very troublesome gross imbalances. This is avoided, as later explained, by insuring that the Coset Leader sequence or its complement cannot appear in the data register.

The Coset Leader contributions of the invention thus insure no strong imbalance in modulation advances and delays even within a single Loran-C group.

The scheme of bit-flipping or inverting Data Register #1 used for modulating the first Loran-C group GRIA, so as to provide the complement in the Data Register #3 of the third Loran-C group, and similarly inverting the data of Data Register #2 of the second Loran-C group in Data Register #4 of the fourth Loran-C group insures, moreover, zero imbalance after four groups have been received — thus eliminating the possibility of the receiver having any substantial navigation position error because of the communication modulation — but, unlike the said Coast Guard High Speed Communication System, or any other prior systems, does so regardless of delayed Loran-C signal receptions by skywave transmission offsets, fluctuations or other interference, as will now be explained.

Figure 2A:
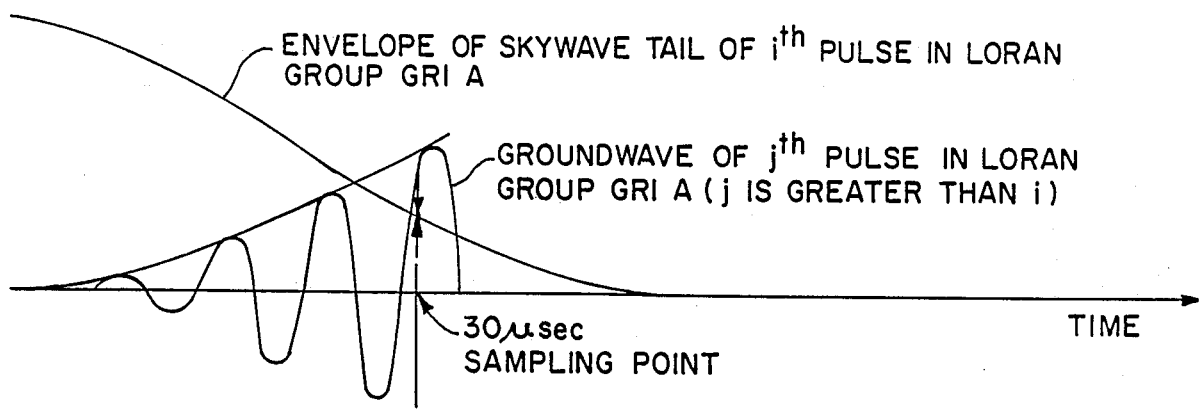
FIGS. 2A, 2B and 2C are waveform diagrams illustrating the operation of the invention in the presence of skywave interference.
Figure 2B:
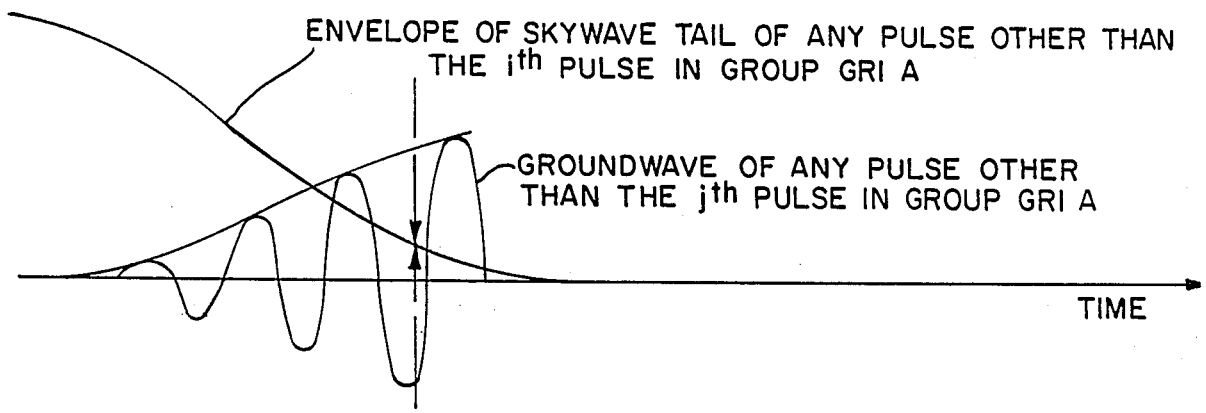
Figure 2C:
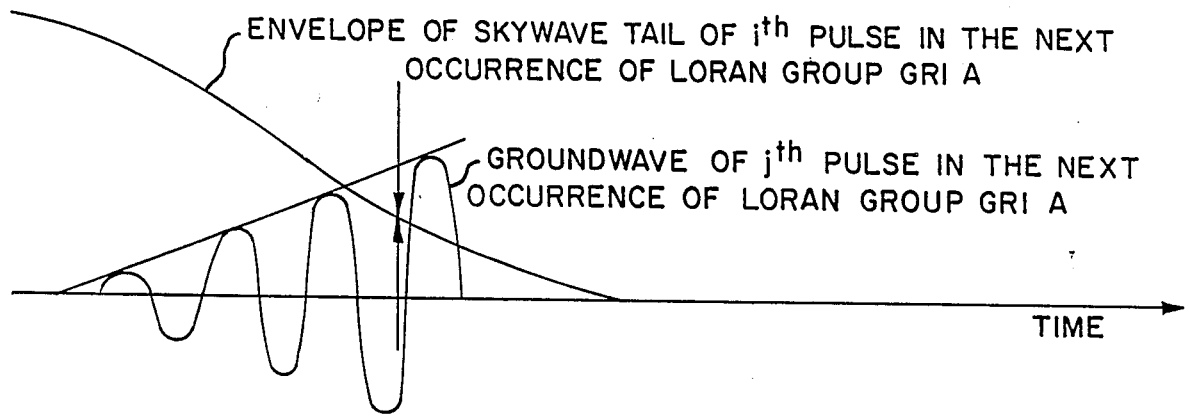

Referring to FIG. 2A, the groundwave-received jth Loran-C pulse in a group is shown together with the tail of the skywave received ith pulse in the group, with the crosses showing the sampled values of the skywave interference. By the above-mentioned bit-flip to the third GRI, it will be noted from FIG. 2C that the skywave sampled signal wil be identical to that in FIG. 2A ( and as distinguished from the very different skywave tail and sampled signal thereon shown for any pulse other than the jth pulse of the first or third groups in FIG. 2B). This identity is important for the operation of the complementary phase code which, in Loran-C, is used to cancel the effect of skywave signals. Otherwise, the skywave voltages (FIGS. 2A and 2B) at the sampling points may be non-identical so that proper operation of the complementary code used to cancel skywave cannot be insured, and there may be substantial skywave interference introduced because of the communication modulation that causes these pulses to be advanced and delayed. (Mathematical analysis of this is presented in my said PLANS article).

Turning, now, to the details of the before-mentioned encoding E of the raw data, FIG. 1, reference is made to FIG. 5A where the raw communication data, as from a teletype or other data source is applied to the encoder E adapted, in accordance with the invention to apply, to either block or convolutional error-detecting and correcting codes. Such codes and encoders are described in G. C. Clark and J. B. Cain "Error Correcting Codes for Digital Communication", Plenum, New York, 1981; and A. J. Viterbi and J. K. Omura, "Principle of Digital Communication and Coding", McGraw Hill, New York, 1979. As more particularly shown in FIG. 5B, consider a block code with the raw data broken into blocks of K bits for each code, shown as K=6, with illustrative code blocks 011100, 011111 and 100101. The Encoder "maps" each K bit block into an N-bit block, shown as N=10, greater than K, because it is adding (N-K) parity (or error-checking) bits. These N-bits blocks (1111000011, etc.) are called codewords and there is only one for each of the original K-bit raw data blocks. (A code is a 1-to-1 mapping). Consequently, there are $2^K$ codewords or 64 in this example. However, altogether there are $2^N$ possible N-bit blocks ($2^{10}$ or 1,024 in this case). This means $2^N - 2^K$ N-bit blocks can never occur. Of the possible 1,024 10-bit blocks that could be appearing in the data registers, none but 64 will appear. Hence, the Coset Leader sequence and its complement, as previously stated, will be selected such that they will never appear in the data registers of FIG. 1. Multiplication by the Coset Leader sequence, FIG. 1, will thus insure that no strong imbalances occur in a single group, as earlier described.

Figure 3:
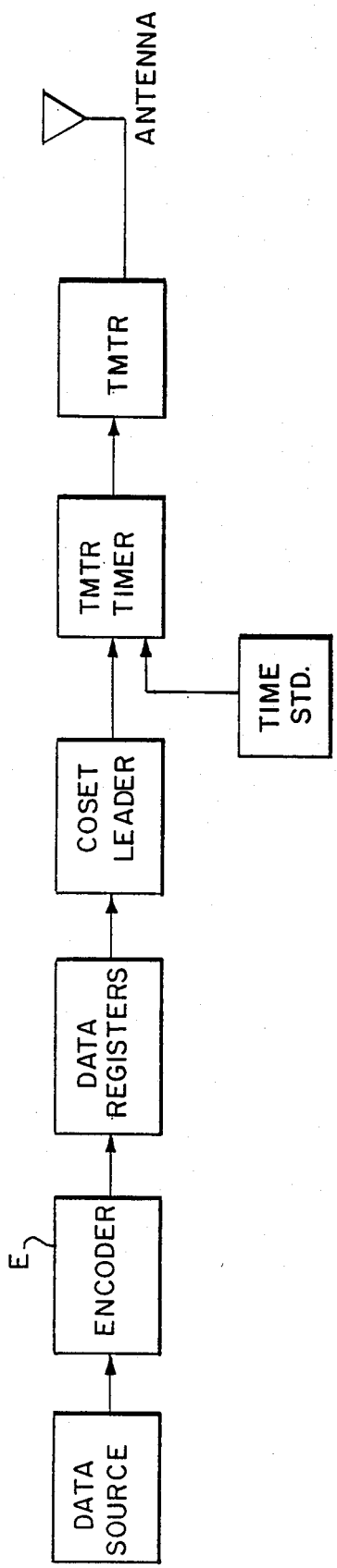
FIG. 3 is a block diagram of a transmitter adapted to practice the invention.

A suitable transmitter system for operating in accordance with the method of the invention is shown in FIG. 3 wherein the data source and encoder E of FIGS. 1 and 5A are shown applying the encoded data of N-bit blocks containing the error-detecting code above described, to the Data Registers (#1, #2, #3, etc. of FIG. 1) of successive Loran-C pulse groups (GRIA, GRIB, GRIA, etc.). The encoded sequences for transmission are multiplied by the Coset Leader sequences to effect logical multiplication that produces respective resulting data sequences that insure against imbalance in the + and − (or 1 and 0) position modulations in the respective Loran-C pulses generated in the radio-frequency transmitter "Tmtr" under control of the time-standard-controlled timer and broadcast from the antenna — Loran-C navigation pulses simultaneously containing communication data. As earlier stated, preferably the pulse position modulation, representing this data, is effected on pulses P3–P8 with no modulation on the first two Loran-C pulses P1, P2 (FIGS. 4A and 4B); and, instead of symmetrical advance and delay time intervals, compensation is made for the different amplitudes at sampling points of the third or captive cycle on the positive and negative sides of the sixth zero crossing used for navigation position determination, caused by the increasing pulse envelope, by advancing a time T, shown on pulse P5, of the order of a microsecond for normally 1 millisecond pulse spacing, FIG. 4A, and delaying (shown on pulse P8) a slightly asymmetric (lesser) time interval fT, about 0.9 to 0.97 microsecond.

While various types of receivers may be used, as described in said patents and articles, FIG. 6 illustrates a suitable receiver of the hard limiter type. The received Loran-C signals are passed through a front end comprising bandpass filters and amplifiers before hard limiting that produces a square waveform that retains phase information— FIG. 7A illustrating the output for an advance (+1) modulation, and FIG. 7B, a delay or −1 or "0", the tracking sample point being indicated by the crosses representing the expected time of the sixth zero crossing point of the Loran-C pulse. These samples are what the navigation processor, in the normal Loran receiver, receives and monitors, and they will continue to be fed directly into the navigation processor as if the communications did not exist at all; the navigation processor driving the navigation display to determine position. However, these very same receiver samples are also inputted separately to the communication processor which will be concerned with pulses three through eight, because they are the ones that are modulated. If the sample is +V, FIG. 7A, it will determine that the pulse has been advanced and corresponds to a +1. If, however, it finds that the sample is equal to −V, FIG. 7B, then it will determine that the pulse was delayed, which corresponds to a −1 or 0. So those + and −1s will then go through a process which is the inverse or reverse of what happened in FIG. 3, having the effect of removing the Coset Leader sequence and filling a data register for subsequent treatment by a demodulating decoder which performs the inverse mapping from the code words back to the original data; and finally, then, the user will interpret the data as in a display or other read-out.

Thus, in its preferred totality, the invention, through the use of the particular type of encoding described herein, with bit-flip inversion, insures zero imbalance after four Loran-C GRI's, and irrespective of the nature of the input communication data and also regardless of any skywave phase offset or fluctuations or other interference; and with insurance, also, through the Coset Leader sequences, of no strong advance or delay modulation imbalance in even a single group of the Loran-C pulses.

Further modifications will also occur to those skilled in this art, and such are considered to fall within the spirit and scope of the invention as defined in the appended claims.

What is claimed is:

1. In a Loran-C navigation and message communication system in which a plurality of successive Loran-C pulses within successive groups of such pulses are pulse position modulated to communicate blocks of K raw data bit messages, a method of reducing errors in the reception of said pulses for navigation purposes in monitoring for a predetermined zero crossing within each successive pulse of each group, such errors being caused by skywave-introduced phase offsets and fluctuations, and regardless of the nature of the bit messages, said method comprising converting the successive blocks of K raw data bits into respective encoded data of N bit blocks, where N is greater than K, and containing an error-detecting code; applying the respective encoded data blocks to successive Loran-C pulse groups; logically multiplying the successive encoded sequences of the first and second Loran-C pulse groups by respective coset leader sequences to produce respective resulting data sequences that insure against strong imbalance in the plus and minus position modulations in any single group of pulses; pulse-position modulating certain of said plurality of pulses in the first and second groups of Loran-C pulses with the respective resulting data sequences; inverting the respective encoded sequences for the first and second Loran-C pulse groups and applying the same, respectively, as the encoded data for the third and fourth Loran-C pulse groups; logically multiplying the same with the said respective coset leader sequences to produce resulting data sequences in the third and fourth Loran-C groups, complementary to the respective resulting data sequences of the first and second Loran-C groups; pulse-position modulating certain of the plurality of pulses in the third and fourth groups of Loran-C pulses with the corresponding last-named resulting data sequences; and insuring that said coset leader sequences are excluded as a possible code for the converted raw data, whereby identical plus and minus position shifts will occur in the first and third Loran-C pulse groups and identical shifts in the second and fourth Loran-C pulse groups, each in perfect balance irrespective of the nature of the raw data and irrespective of skywave interference.

2. A method as claimed in claim 1 and in which the modulation is slightly asymmetric in plus and minus pulse position advance and delay.

3. A Loran-C navigation and message communication system having, in combination, means for transmitting successive Loran-C pulses within successive groups of such pulses; means for pulse-position modulating certain of the pulses within each group to communicate blocks of K raw data bit messages; encoder means for converting the successive blocks of K raw data bits into respective encoded data N bit blocks, where N is greater than K, and containing an error-detecting code; means for applying the respective encoded data blocks to data registers representing successive Loran-C pulse groups; coset leader means for logically multiplying the data in the data registers with coset leader sequences to produce respective resulting data sequences that insure against strong imbalance in plus and minus position modulations in any single group of pulses; means for pulse-position modulating certain of the said plurality of successive pulses in the first and second groups of Loran-C pulses with the respective resulting data sequences; means for inverting the respective encoded sequences for the first and second Loran-C pulse groups and applying the same respectively as the encoded data for the data registers of the third and fourth Loran-C pulse groups, respectively; means for logically multiplying the same with the coset leader sequences to produce resulting data sequences complementary to the respective first and second resulting data sequences; means for pulse-position modulating certain of the plurality of successive pulses in the third and fourth groups of Loran-C pulses with the respective last-named resulting data sequences; and means associated with the encoder means for insuring that said coset leader sequence is excluded as a possible code for the converted raw data, whereby identical plus and minus pulse position shifts will occur in the first and third and second and fourth Loran-C pulse groups in perfect balance, irrespective of the nature of the raw data and irrespective of skywave interference.

4. A Loran-C system as claimed in claim 3 and in which said certain pulses are the third through eighth pulses of each group.

5. A Loran-C system as claimed in claim 4 and in which the plus and minus modulations are adjusted to be slightly asymmetric.

6. In a Loran-C navigation and message communication system employing the method of claim 1, receiving the Loran-C pulses and processing the said predetermined zero crossing times to provide navigation position; and separately monitoring the modulated pulses, processing the same to remove the said coset leader code logical multiplication therefrom, and demodulating and decoding the data to recover the original message data.

7. In a Loran-C navigation and message communication network employing the system of claim 3, means for receiving the Loran-C pulses and processing the said predetermined zero crossing times to provide navigation position; and means for separately processing the modulated pulses including means for removing the said coset leader logical multiplication therefrom and means for demodulating and decoding the data to recover the original message.

* * * * *